(12) United States Patent
Larsson et al.

(10) Patent No.: US 10,260,554 B2
(45) Date of Patent: Apr. 16, 2019

(54) ACTUATOR ASSEMBLY COMPRISING A BEARING

(71) Applicant: Aktiebolaget SKF, Gothenburg (SE)

(72) Inventors: Reine Larsson, Lerum (SE); Nils Manne, Goeteborg (SE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/350,752

(22) Filed: Nov. 14, 2016

(65) Prior Publication Data

US 2017/0175807 A1 Jun. 22, 2017

(30) Foreign Application Priority Data

Dec. 17, 2015 (SE) ...................................... 1551669

(51) Int. Cl.
*F16C 17/10* (2006.01)
*F16C 33/20* (2006.01)
*F16H 25/24* (2006.01)
*B62D 35/00* (2006.01)

(52) U.S. Cl.
CPC .............. *F16C 17/10* (2013.01); *F16C 33/20* (2013.01); *F16H 25/24* (2013.01); *B62D 35/00* (2013.01)

(58) Field of Classification Search
CPC ................................ F16C 17/10; F16C 17/105
See application file for complete search history.

(56) References Cited

U.S. PATENT DOCUMENTS

| | | | | |
|---|---|---|---|---|
| 93,348 | A | * 8/1869 | Robirds | F16C 17/04 16/DIG. 27 |
| 513,367 | A | * 1/1894 | Parsons | F16C 17/04 384/424 |
| 1,444,765 | A | * 2/1923 | Veeder | F16C 23/02 384/424 |
| 2,970,869 | A | * 2/1961 | Thomas | F16C 33/208 384/416 |
| 3,271,721 | A | * 9/1966 | Gordon | H01C 10/42 338/180 |
| 3,493,273 | A | 2/1970 | Greenberg | |
| 3,712,338 | A | 1/1973 | Bucalo | |
| 4,296,978 | A | * 10/1981 | Loser | F16C 33/20 384/441 |

* cited by examiner

*Primary Examiner* — Thomas R Hannon
(74) *Attorney, Agent, or Firm* — Bryan Peckjian; SKF USA Inc. Patent Dept.

(57) ABSTRACT

An actuator assembly includes an actuator with a cylinder-shaped shaft rotatable around an axially extending center axis (A), and the shaft includes an envelope surface. The assembly further provides a fixed, tubular bearing surrounding a section of the shaft, the bearing having an inner surface facing the envelope surface of the shaft so that an interface between the shaft and the bearing is created. The interface provides at least one circumferential groove and at least one complimentary circumferential ridge. The groove is arranged in the one of the envelope surface of the shaft and the inner surface of the bearing and the complimentary ridge is arranged in the other of the envelope surface of the shaft and the inner surface of the bearing.

16 Claims, 3 Drawing Sheets

ACTUATOR ASSEMBLY COMPRISING A BEARING

CROSS REFERENCE TO RELATED APPLICATIONS

This application claims priority to Swedish patent application no. 1551669-3 filed on Dec. 17, 2015, the contents of which are fully incorporated herein by reference.

FIELD OF THE INVENTION

On a general level, the present invention relates to an assembly comprising an actuator and a bearing that supports the actuator.

BACKGROUND OF THE INVENTION

An actuator is a device typically used to control a mechanism, such as a valve, based on an input received from a control unit. Often, an actuator is supported by a bearing that takes up at least some of the load exerted on the actuator. In this way, the wear is reduced and the useful life of the parts of the actuator is prolonged.

In another application, an actuator, e.g. a linear actuator, may be used to open/close a wind deflector arranged on top of driver's cab of a trailer-hauling tractor. The purpose of such a wind deflector is to reduce air resistance experienced by the hauled trailer. The actuator that actuates the wind deflector is exposed to substantial forces—in axial as well as in radial direction. This is particularly true when the wind deflector is in the open position. The problem at hand is traditionally remedied by employing a flange-based bearing.

A bearing solution of the above kind performs acceptably, but is rather structurally complex and makes mounting and service difficult. In addition and as is known in the art, the flange bearing requires a great deal of space—rather inconvenient in the context of a modern trailer-hauling tractor.

An objective of the present invention is therefore to provide a simplified way for supporting an actuator. A further objective is to provide a compact bearing solution that is easy to mount and service.

BRIEF SUMMARY OF THE INVENTION

Accordingly, the actuator assembly provides an actuator comprising a cylinder-shaped shaft rotatable around an axially extending center axis, the shaft having an envelope surface, and a fixed, tubular bearing surrounding a section of the shaft, the bearing having an inner surface facing the envelope surface of the shaft so that an interface between the shaft and the bearing is created. The interface provides at least one circumferential groove and at least one complimentary circumferential ridge, and the groove is arranged in the one of the envelope surface of the shaft and the inner surface of the bearing and the complimentary ridge is arranged in the other of the envelope surface of the shaft and the inner surface of the bearing.

In the following, positive effects and advantages of the invention at hand are presented.

The present invention is based on the insight that if the rotatable shaft of the actuator is made to engage with a commensurately shaped bearing, then a single, multi-purpose bearing is sufficient to support the shaft with respect to axial as well as radial loads. In particular, the circumferential ridge mates with the complimentary groove resulting in a tight fit that is able to support multidirectional axial loads as well as radial loads. Here, the depth of the grooves and the size of the indentation-free surface in the axial peripheries of the interface and between the grooves will be determined by the load situation. More specifically, a small axial load paired with a high radial load typically results in a design comprising fewer and shallow grooves and rather large indentation-free surface, whereas a high axial load paired with a low radial load normally requires a design having more and deeper grooves while the indentation-free surface need not be large.

Clearly, a single bearing able to take up axial loads of all directions as well as radial loads presents an improvement over prior art, in particular when it comes to mounting and servicing the bearing. In addition, the aforementioned, bulky flange bearing may be dispensed with. This opens for the use of the inventive bearing in previously unsuitable, tight spaces and widens its applicability in comparison with the bearing solutions belonging to the prior art.

Different embodiments of the invention are disclosed in the dependent claims and in the detailed description.

Further advantages and features of embodiments will become apparent when reading the following detailed description in conjunction with the drawings.

DETAILED DESCRIPTION OF THE INVENTION

The present invention will now be described more fully hereinafter with reference to the accompanying drawings, in which preferred embodiments are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1A:
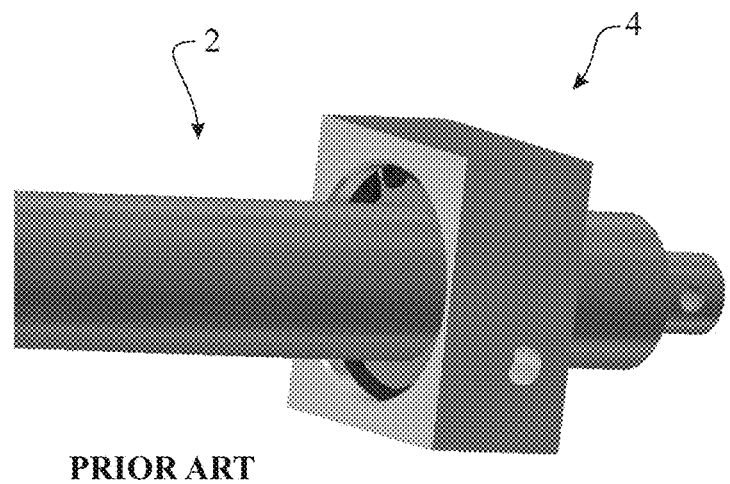
FIG. 1A is a perspective view of a portion of an actuator with a flange-based bearing solution belonging to the prior art.

FIG. 1A is a perspective view of a portion of an actuator 2 with a flange-based bearing solution 4 belonging to the prior art. As easily seen, the bearing 4 is bulky, the fact that precludes its mounting in tight spaces. This also severely limits its applicability.

Figure 1B:
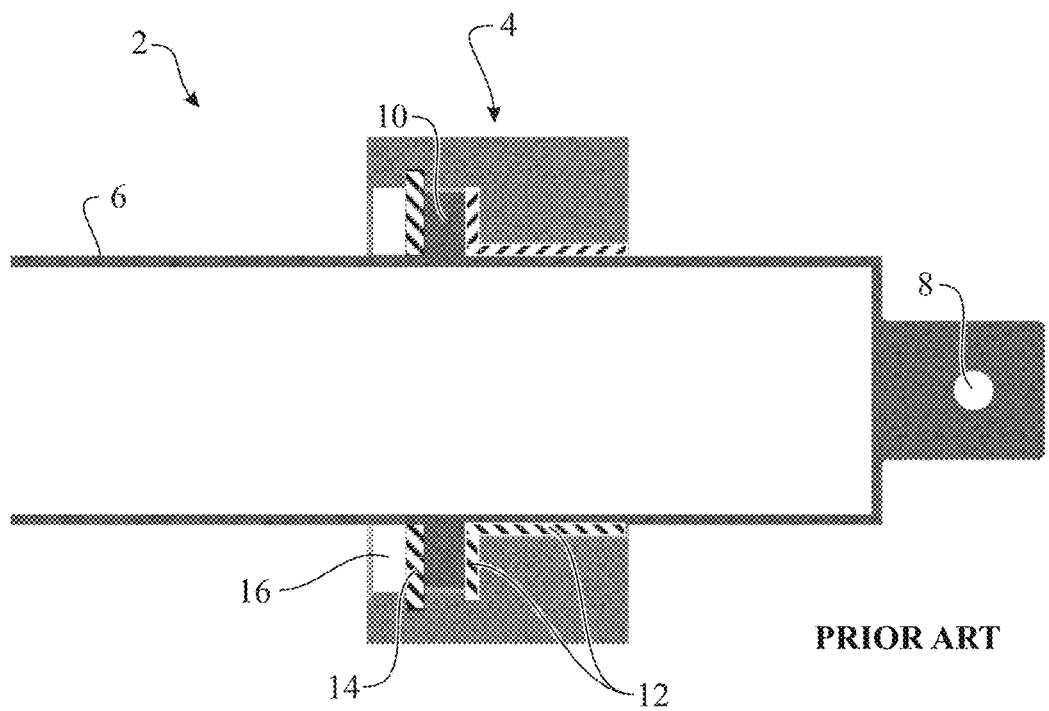
FIG. 1B is a view of the radial section of the portion of the actuator of FIG. 1A.

FIG. 1B is a view of the radial section of the portion of the actuator 2 of FIG. 1A. A cylinder-shaped shaft 6, rotatable around its center axis (not shown in FIG. 1A), may be seen. Also, a point of attachment 8, here a through-hole, for fixating the actuator 2 is shown. Normally, the actuator of the shown type is driven by an electric motor (not shown). The cylinder-shaped shaft 6 has a radially extending flange 10. The flange is sandwiched between a collar bushing 12 and a locking ring 14. The collar bushing 12 may take up loads exerted on the cylinder-shaped shaft 6 of the actuator 2. In particular, radial loads may be accommodated, as well as axial loads directed towards the point of attachment 8. However, the axial loads directed in the opposite direction cannot be taken up by the shown flange-based bearing 4. Purpose of the locking ring 14 is to restrain movement of the remaining parts of the bearing 4. An empty space 16 provided next to the locking ring 14 accommodates axial motion of the locking ring 14. As argued above, the flange-based bearing solution 4 of the above-discussed kind may only support axial loads in a single direction. In addition, the bearing 4 is rather structurally complex and makes integration with the actuator 2 and service difficult.

Figure 2A:
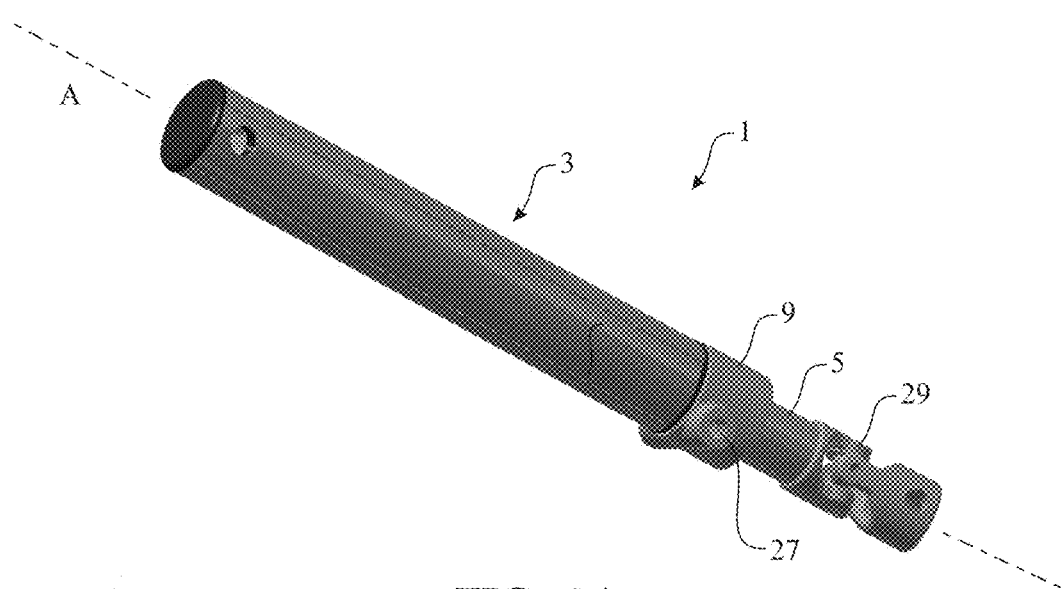
FIG. 2A is a perspective view of an actuator assembly according to one embodiment of the present invention.

FIG. 2A is a perspective view of an actuator assembly 1 according to one embodiment of the present invention. Shown actuator assembly 1 is a linear actuator 3 suitable for controlling operation of a vehicle's wind deflector (not shown). Accordingly, the assembly 1 provides an actuator 3 comprising a cylinder-shaped shaft 5 rotatable around an axially extending center axis A. A fixed, tubular bearing 9 surrounds a section of the shaft 5. The immobilization of the bearing 9 is achieved by rigidly connecting its attachment point 27 to a fixed surface (not shown). Attachment point 29 of the actuator assembly itself is also shown.

Figure 2B:
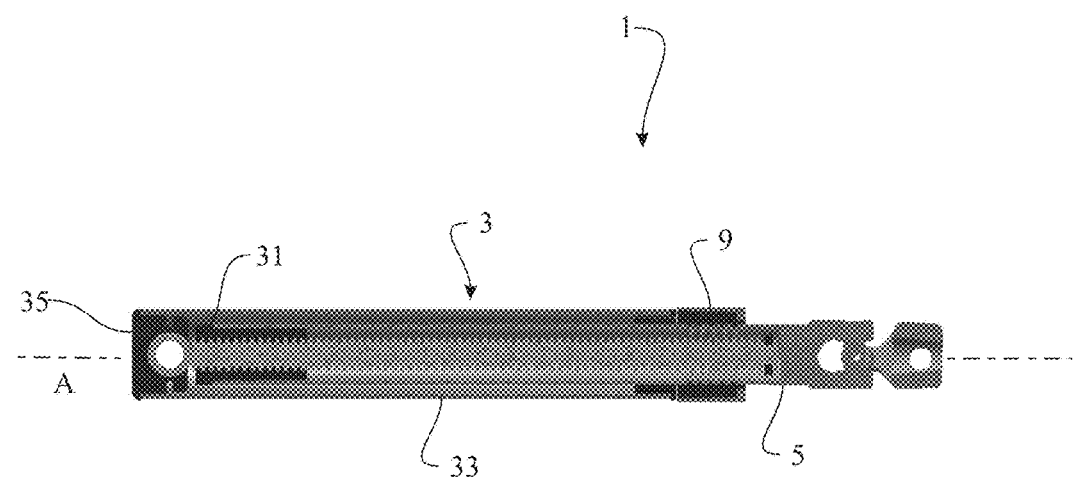
FIG. 2B is a view of the radial section of the actuator assembly of FIG. 2A.

FIG. 2B is a view of the radial section of the actuator assembly 1 of FIG. 2A. The previously-discussed shaft 5 may be seen. Moreover, the assembly provides a nut 31 and an axially movable tube 33. Driving means (not shown) that is typically a motor or a manually operated crank brings about rotation of the shaft 5 about its axially extending center axis A. The nut 31 transfers this rotative motion into linear motion of the tube 33 along the axis A. An end surface 35 of the tube is typically connected to a part the operation of which one wishes to control. Accordingly, in one embodiment (not shown) the end surface of the tube 35 may be connected to a vehicle's wind deflector (not shown). An inventive bearing 9, more thoroughly discussed in connection with FIGS. 3 and 4, may also be seen in FIG. 2B.

Figure 3:
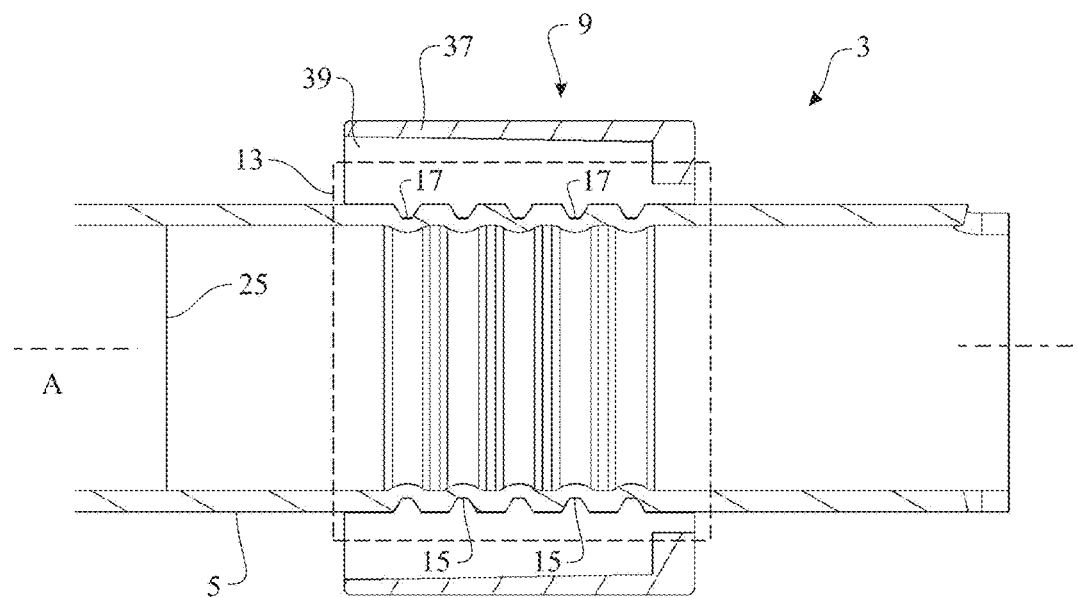
FIG. 3 is a view of the radial section of an interface between a cylinder-shaped shaft and a bearing according to one embodiment of the present invention.

FIG. 3 is a view of the radial section of an interface 13 between a cylinder-shaped shaft 5 and a bearing 9 according to one embodiment of the present invention. Accordingly, a tubular bearing 9 with its outer housing 37 is shown. Here, the housing 37 is normally made of metal, while an inner section 39 of the bearing is in the shape of a hollow cylinder and typically cast in polymer material, such as Polyoxymethylene (POM; also known as Acetal). The inner section 39 normally consists of two identical half cylinders, but other configurations, such as a plurality of cylinder segments, are also conceivable. In the context, the hollow cylinder of the inner section 39 may consist of several successive cylinders. Regardless of the realization, the inner section 39 is kept in place by the housing 37. This design provides a simple and cost-effective solution that fulfills the demands of the actuator assembly, e.g. to accommodate both multidirectional axial forces and radial forces. The bearing 9 surrounds a section of the shaft 5 and has an inner surface (provided with a reference numeral in FIG. 4) facing an envelope surface (provided with a reference numeral in FIG. 4) of the shaft so that an interface 13 between the shaft 5 and the bearing 9 is created. The shaft 5 is typically made in a durable material such as steel.

As it may clearly be seen, five circumferential grooves 15 are arranged in the envelope surface of the shaft 5 and five complimentary circumferential ridges 17 are arranged in the inner surface of the bearing 9. In the shown embodiment, the groove-ridge pairs 15, 17 are mutually parallel and equidistantly arranged. In an alternative embodiment (not shown), the circumferential grooves may be arranged in the inner surface of the bearing and the thereto complimentary ridges may be arranged in the envelope surface of the shaft. By virtue of any of these arrangements, a single, multi-purpose bearing is sufficient to support the shaft with respect to all external loads. In particular, each circumferential ridge mates with the corresponding complimentary groove resulting in a tight fit that is able to support multidirectional axial loads as well as radial loads.

As it may be seen, the grooves 15 in FIG. 3 have a trapezoidal cross-section, but other designs, e.g. a quadrangular cross-section, are also envisageable. In the context, combining different groove designs in a single bearing is also conceivable.

Still with reference to FIG. 3, it has been established that good overall load uptake is achieved by dimensioning the components of the actuator 3 so that the inner diameter 25 of the cylinder-shaped shaft 5 is equal to the shortest distance between the two grooves that are farthest away from each other. In the embodiment shown in FIG. 3, comprising five groove-ridge pairs, the inner diameter is approximately 40 mm.

Figure 4:
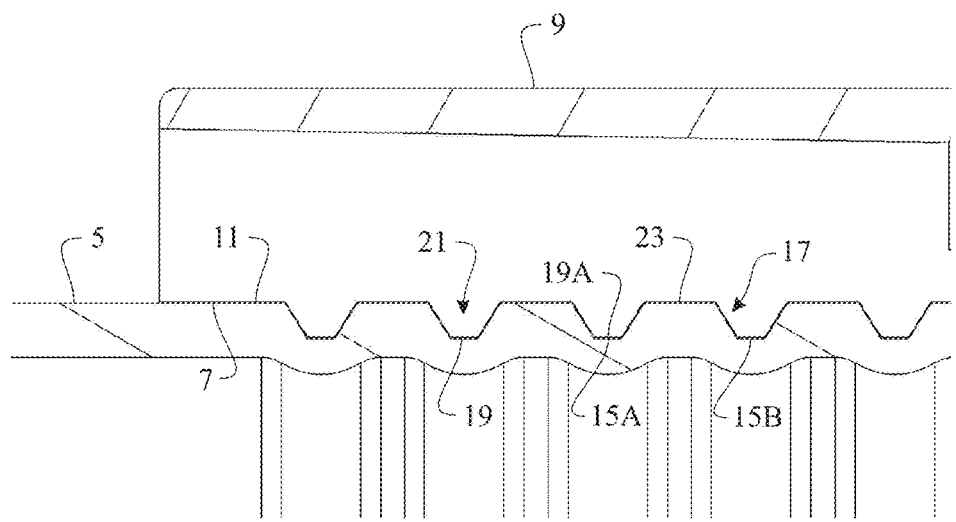
FIG. 4 is a close-up of a detail of FIG. 3 showing properties of grooves arranged in the envelope surface of the actuator shaft and according to one embodiment of the present invention.

FIG. 4 is a close-up of a detail of FIG. 3 showing properties of grooves 15 arranged in the envelope surface 7 of the actuator shaft 5 and according to one embodiment of the present invention. An inner surface 11 of the bearing 9, the surface facing the envelope surface 7 of the actuator shaft 5 is also shown. The grooves 15 have a trapezoidal cross-section. As it may be seen, the trapezoid is an isosceles trapezoid and a proximal base 19 of the isosceles trapezoid with respect to the central axis of the actuator shaft (not shown in FIG. 4) is shorter than a distal base 21 of the trapezoid. Here, the height of the isosceles trapezoid is normally in the low millimeter range. The same is true for its proximal 19 as well as for its distal 21 base.

The depth of the grooves 15, i.e. the height of the trapezoid, and the size of the indentation-free surface in the axial peripheries of the interface and between the grooves will be determined by the load situation. More specifically, it has been established that high axial loads paired with limited radial loads are best accommodated by a bearing 9 where the perimetral length of a section 23 of the cylinder-shaped shaft that extends between two neighboring grooves 15A, 15B equals the length of the proximal base 19A associated with at least one of the two grooves 15A, 15B.

In a related context, when providing support for a shaft 5 exposed to high radial loads and relatively small axial loads, the perimetral length of a section 23 of the cylinder-shaped shaft 5 that extends between two neighboring grooves 15A, 15B should differ from the length of the proximal base 19A associated with at least one of the two grooves 15A, 15B.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:
1. An actuator assembly comprising:
 an actuator having a cylinder-shaped shaft rotatable around an axially extending center axis (A),
 a tube surrounding the cylinder-shaped shaft and axially moveable with respect to the shaft,
 an envelope surface on the shaft, and a fixed, hollow cylinder-shaped bearing surrounding the envelope surface on the shaft, the bearing having an inner surface facing the envelope surface of the shaft so that an interface between the shaft and bearing is created in the section of the shaft surrounded by the hollow cylinder-shaped bearing, a hollow cylindrical-shaped housing abutting the bearing, the housing configured to hold the bearing in place, an attachment point formed in the housing, the attachment point configured to secure the bearing to a fixed surface, wherein the interface includes at least one circumferential groove and at least one complimentary circumferential ridge, and wherein the groove is arranged in the one of the envelope surface of the shaft and the inner surface of the bearing and the complimentary ridge is arranged in the other of the envelope surface of the shaft and the inner surface of the bearing.

2. The actuator assembly according to claim 1, wherein the at least one groove is arranged in the envelope surface of the shaft and the complimentary ridge is arranged in the inner surface of the bearing.

3. The actuator assembly according to claim 1, wherein the at least one groove is arranged in the inner surface of the bearing and the complimentary ridge is arranged in the envelope surface of the shaft.

4. The actuator assembly according to claim 1, wherein the at least one groove has a trapezoidal cross-section.

5. The actuator assembly according to claim 4, wherein the trapezoid is an isosceles trapezoid and a proximal base of the isosceles trapezoid with respect to the central axis is shorter than a distal base of the isosceles trapezoid.

6. The actuator assembly according to claim 1, wherein the interface further comprises:
  a second circumferential groove and a second circumferential ridge,
  wherein the at least one circumferential groove and the second circumferential groove are neighboring grooves and arranged in the envelope surface of the shaft and the at least one complimentary ridge and the second circumferential ridge are arranged in the inner surface of the bearing, and
  a perimetral length of a section of the cylinder-shaped shaft that extends between two neighboring grooves equals the length of the proximal base associated with at least one of the two grooves.

7. The actuator assembly according to claim 1, wherein the interface further comprises:
  a second circumferential groove and a second circumferential ridge,
  wherein the at least one circumferential groove and the second circumferential groove are neighboring grooves and arranged in the envelope surface of the shaft, and the at least one complimentary ridge and the second circumferential ridge are arranged in the inner surface of the bearing,
  the at least one circumferential groove and the second circumferential groove have an isosceles trapezoidal cross-section having a proximal base with respect to the central axis and a distal base with respect to the central axis, and the proximal base is shorter than a distal base, and
  a perimetral length of a section of the cylinder-shaped shaft that extends between two neighboring grooves differs from the length of the proximal base associated with at least one of the two grooves.

8. The actuator assembly according to claim 1, wherein the at least one groove has a quadrangular cross-section.

9. The actuator assembly according to claim 1, wherein the groove-ridge pairs are equidistantly arranged.

10. The actuator assembly according to claim 1, wherein the interface further comprises:
  a second circumferential groove and a second circumferential ridge,
  wherein the at least one circumferential groove and the second circumferential groove are arranged in the one of the envelope surface of the shaft and the inner surface of the bearing and the at least one complimentary ridge and the second circumferential ridge is arranged in the other of the envelope surface of the shaft and the inner surface of the bearing, and
  wherein the inner diameter of the cylinder-shaped shaft is equal to the distance between the two grooves that are farthest away from each other.

11. The actuator assembly according to claim 1, wherein the actuator is a linear actuator.

12. The actuator assembly according to claim 11, wherein the linear actuator controls a wind deflector that is part of a vehicle.

13. The actuator assembly according to claim 1, wherein the housing is composed of a metallic material, and the bearing is composed of a polymer material.

14. An actuator assembly comprising:
  an actuator having a cylinder-shaped shaft rotatable around an axially extending center axis (A),
  a tube surrounding the cylinder-shaped shaft and axially moveable with respect to the shaft,
  an envelope surface on the shaft,
  a fixed, hollow cylinder-shaped bearing surrounding a section of the shaft, the bearing having an inner surface facing the envelope surface of the shaft so that an interface between the shaft and bearing is created in the section of the shaft surrounded by the hollow cylinder-shaped bearing, and the bearing having a substantially smooth outer surface,
  a hollow, cylinder-shaped housing surrounding the outer surface of the bearing, the housing having a substantially smooth surface abutting the substantially smooth outer surface of the bearing, and the housing is configured to hold the bearing in place,
  wherein the interface includes a plurality of circumferential grooves and a plurality of complimentary circumferential ridges, and
  wherein the plurality of circumferential grooves is arranged in the one of the envelope surface of the shaft and the inner surface of the bearing and the plurality of complimentary ridges is arranged in the other of the envelope surface of the shaft and the inner surface of the bearing.

15. The actuator assembly according to claim 14, wherein the cylinder-shaped shaft has a diameter equal to a distance between a first circumferential groove of the plurality of grooves and a second circumferential groove of the plurality of grooves, and the first and second circumferential grooves are a pair of circumferential grooves of the plurality of circumferential grooves that are farthest away from each other.

16. The actuator assembly according to claim 14, each circumferential groove of the plurality of circumferential grooves is paired with a circumferential ridge of the plurality of circumferential ridges and each circumferential groove and circumferential ridge pair is equidistantly arranged.

\* \* \* \* \*